United States Patent
Bruck

(10) Patent No.: US 10,661,370 B2
(45) Date of Patent: May 26, 2020

(54) FORMATION AND REPAIR OF OXIDE DISPERSION STRENGTHENED ALLOYS BY ALLOY MELTING WITH OXIDE INJECTION

(71) Applicant: Siemens Energy, Inc., Orlando, FL (US)

(72) Inventor: Gerald J. Bruck, Titusville, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 1197 days.

(21) Appl. No.: 14/859,816

(22) Filed: Sep. 21, 2015

(65) Prior Publication Data
US 2017/0080508 A1   Mar. 23, 2017

(51) Int. Cl.
*B23K 9/04*     (2006.01)
*C23C 26/02*    (2006.01)
(Continued)

(52) U.S. Cl.
CPC .............. *B23K 9/04* (2013.01); *B23K 9/0026* (2013.01); *B23K 9/091* (2013.01); *B23K 9/12* (2013.01);
(Continued)

(58) Field of Classification Search
CPC .......... B23K 2103/08; B23K 2103/166; B23K 2103/18; B23K 2103/50; B23K 9/0026;
(Continued)

(56) References Cited

U.S. PATENT DOCUMENTS 4,261,764 A * 4/1981 Narayan ................ H01C 17/28
                                            148/DIG. 93
4,595,820 A * 6/1986 Richardson .......... B23K 9/0956
                                            219/130.01

(Continued)

FOREIGN PATENT DOCUMENTS

CA   2826655 A1 * 11/2012 ............ H04R 23/00
GB   2218660      * 11/1989

OTHER PUBLICATIONS

Molian, P.A., et al., "Laser Welding of Oxide Dispersion-Strengthened Alloy MA754," Journal of Materials Science, 1992, 27, 2687-94.

(Continued)

*Primary Examiner* — Ibrahime A Abraham
*Assistant Examiner* — Biniam B Asmelash

(57) ABSTRACT

Melting energy exemplified by an arc (24) is delivered to a metal alloy material (22, 23), forming a melt pool (26). A metal oxide material (34) is delivered (33) to the melt pool and dispersed therein. The melting energy and oxide deliveries are controlled (44) to melt the alloy material, but not to melt at least most of the metal oxide material. The deliveries may be controlled so that the melting energy does not intercept the metal oxide delivery. The melting energy may be controlled to create a temperature of the melt pool that does not reach the melting point of the metal oxide. Deliveries of the melting energy and the oxide may alternate so they do not overlap in time. A cold metal transfer apparatus (22) and process (18, 19, 20) may be used for (Continued)

example in combination with an oxide particle pulse delivery device (42, 46).

12 Claims, 4 Drawing Sheets

(51) Int. Cl.
| | |
|---|---|
| B23K 9/00 | (2006.01) |
| B23K 9/12 | (2006.01) |
| B23K 9/23 | (2006.01) |
| B23K 9/32 | (2006.01) |
| B23K 103/08 | (2006.01) |
| B23K 103/18 | (2006.01) |
| B23K 103/00 | (2006.01) |
| B23K 103/16 | (2006.01) |
| B23K 9/09 | (2006.01) |

(52) U.S. Cl.
CPC ............ *B23K 9/23* (2013.01); *B23K 9/324* (2013.01); *C23C 26/02* (2013.01); *B23K 2103/08* (2018.08); *B23K 2103/166* (2018.08); *B23K 2103/18* (2018.08); *B23K 2103/50* (2018.08)

(58) Field of Classification Search
CPC . B23K 9/04; B23K 9/091; B23K 9/12; B23K 9/23; B23K 9/324; C23C 26/02
USPC .... 219/76.12, 76.14, 121.61, 121.65, 121.66
See application file for complete search history.

(56) References Cited

U.S. PATENT DOCUMENTS

| | | | |
|---|---|---|---|
| 4,803,334 A * | 2/1989 | Burke | B23K 26/18 219/121.64 |
| 5,067,986 A | 11/1991 | Fried et al. | |
| 5,449,435 A | 9/1995 | Funkhouser et al. | |
| 2008/0311420 A1 | 12/2008 | Zillmer et al. | |
| 2011/0103961 A1 | 5/2011 | Glover et al. | |
| 2012/0325779 A1 * | 12/2012 | Yelistratov | B23K 9/04 219/76.14 |
| 2013/0299470 A1 * | 11/2013 | Park | B23K 26/083 219/121.66 |
| 2015/0093279 A1 | 4/2015 | Kington et al. | |

OTHER PUBLICATIONS

Z. Feng, Z. Yu, D. Hoelzer, M. A. Sokolov, and L. T. Tan; "Friction Stir Welding of ODS Steels and Advanced Ferritic Structural Steels"; Oak Ridge National Laboratory, Fusion Reactor Materials Program; DOE/ER-0313/54, vol. 54, pp. 51-60; Jun. 30, 2013.

\* cited by examiner

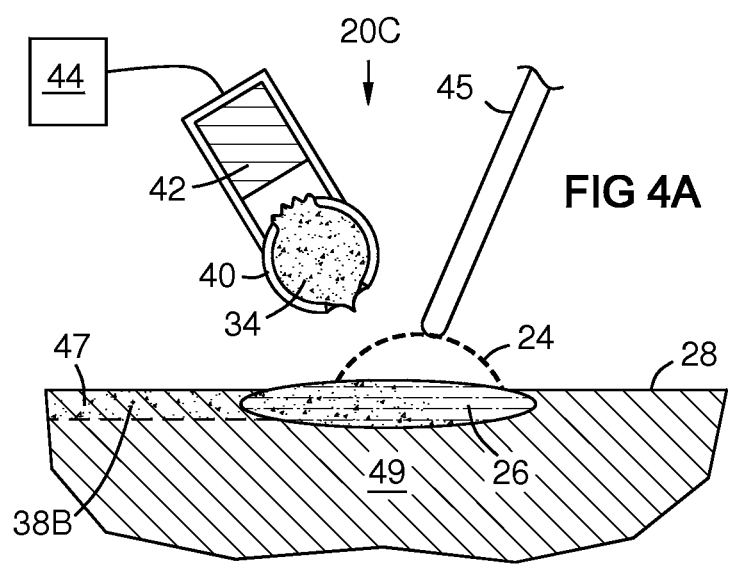
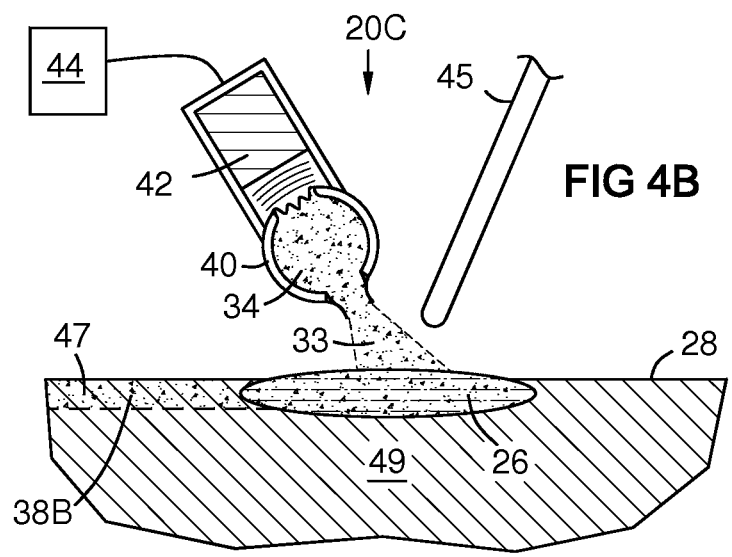

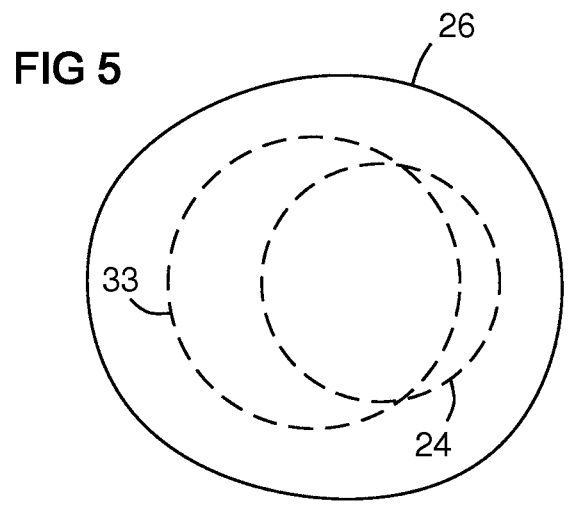
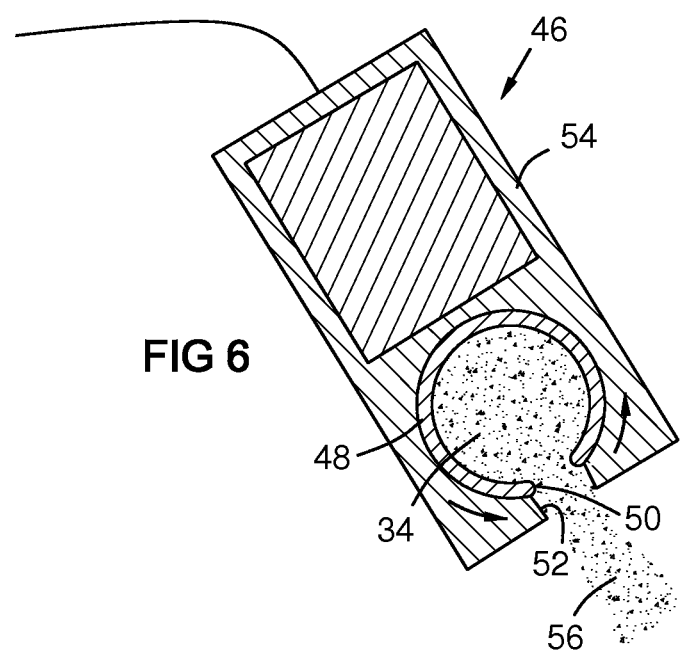

FORMATION AND REPAIR OF OXIDE DISPERSION STRENGTHENED ALLOYS BY ALLOY MELTING WITH OXIDE INJECTION

FIELD OF THE INVENTION

This invention relates generally to the field of metal-component fabrication and repair, and more particularly to the formation of oxide dispersion strengthened (ODS) alloys.

BACKGROUND OF THE INVENTION

Oxide dispersion strengthened (ODS) alloys possess superior properties for high temperature applications; especially ODS alloys formed of superalloy materials. ODS alloys are distinguished from conventional alloys by the presence of dispersoids of fine particles and by an elongated grain shape which generally develops during a recrystallization heat treatment and/or hot and cold working. This particular grain structure enhances the high temperature deformation characteristics of ODS alloys by inhibiting the accumulation of inter-granular damage. As result of this and other properties, components fabricated from ODS alloys exhibit improved high-temperature creep strength and improved oxidation resistance as compared to conventional alloys.

The term "superalloy" is used herein as is understood in the art to describe a highly corrosion and oxidation resistant alloy that exhibits excellent mechanical strength and resistance to creep at high temperatures, as well as good surface stability. Superalloys typically include a base alloying element of nickel, cobalt or nickel-iron. Examples of superalloys include alloys sold under the trademarks and brand names Hastelloy, Inconel alloys (e.g., IN 700, IN 738, IN 792, IN 939), Rene alloys (e.g., Rene N5, Rene 80, Rene 142), Haynes alloys, Mar M, CM 247, CM 247 LC, C 263, 718, X-750, ECY 768, 282, X45, PWA 1483 and CMSX (e.g., CMSX-4, CMSX-8, CMSX-10) single crystal alloys.

ODS alloys, especially superalloys, are very difficult to weld and repair by conventional techniques (e.g., gas tungsten arc welding, laser welding, electron beam welding, etc.). Such fusion welding causes significant loss of strength. The alloys are furthermore difficult and uneconomical to process by less traditional processes such as friction welding.

ODS alloys are manufactured by mechanically alloying mixtures of powders. For example, metal powder such as alloys of iron aluminide, iron chromium, iron-chromium-aluminum, nickel chromium, or nickel aluminide, and oxides such as yttria ($Y_2O_3$) or alumina ($Al_2O_3$) are impacted in a ball mill. Shearing and smearing of the powders produces a fine mixture. A sealed container of the powder is then hot isostatically pressed and hot formed into a desired shape. High temperature heat treatment then provides stress relief and enlarges the grain size. Extraordinary strength is achievable with ODS materials. However, ODS processing is slow, expensive and provides limited control of part geometry. In addition, joining or repair of ODS parts is very difficult. Conventional arc and energy beam processes cause the fine oxide particles to segregate or coalesce, which degrades the result. Nickel based ODS superalloys are especially difficult to cold work and recrystallize.

Additional challenges associated with ODS alloys involve general shaping and joining of these materials. Shaping and joining techniques which preserve the microstructure and intrinsic strength of ODS alloys are severely limited, which often curtails their ability to be incorporated into high-temperature, load-bearing structures. For example, excessive heating of ODS alloys can cause the oxide to coalesce, leading to agglomeration such that the oxide dispersoids may no longer be effective in resisting slip at the grain boundaries. Melting of ODS alloys also results in "slagging off" of the oxide dispersoids reducing their strengthening ability. Since most ODS alloys derive their strength from an elongated grain structure, such disruption of the grain structure reduces strength.

BRIEF DESCRIPTION OF THE DRAWINGS

The invention is explained in the following description in view of the drawings that show:

FIGS. 4A-B illustrate an arc welding embodiment in which oxide injection alternates with the melting energy.

FIG. 5 shows overlapping areas of melting energy and oxide injection at the surface of the melt pool in an embodiment.

FIG. 6 shows an oxide pulse driver comprising a rotating oxide carrier cylinder with a gap that aligns with a gap in a housing to eject an oxide particle pulse.

DETAILED DESCRIPTION OF THE INVENTION

Figure 1A:
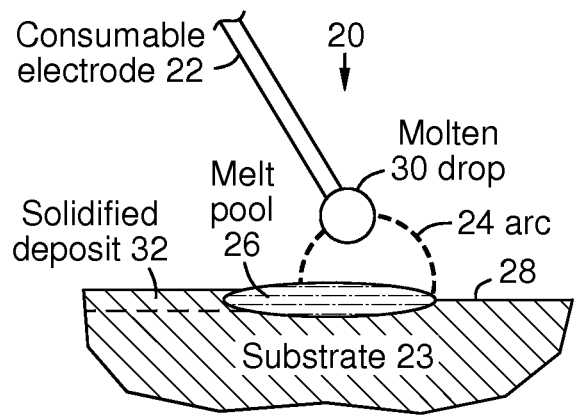
FIG. 1A-1D illustrate apparatus and steps in a known cold metal transfer process.
Figure 1B:
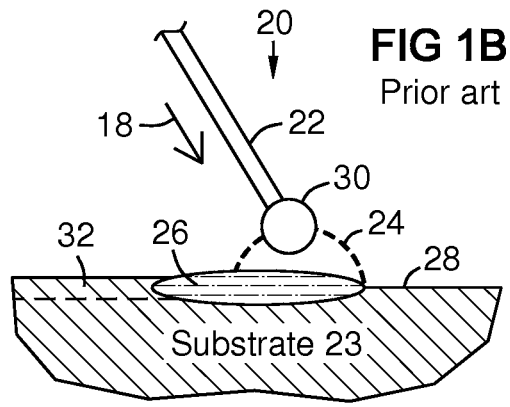
Figure 1C:
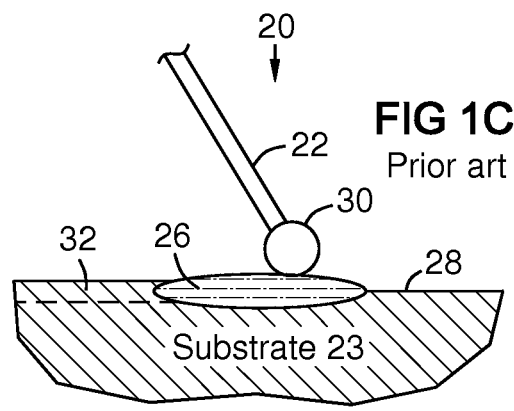
Figure 1D:
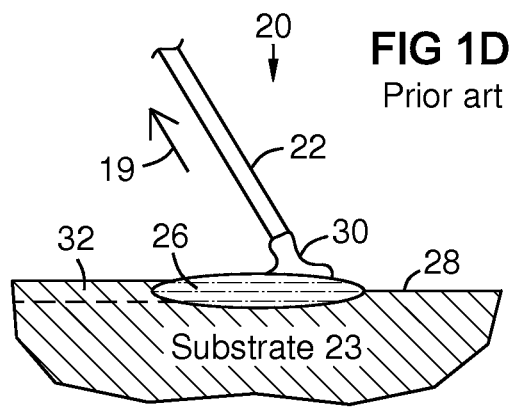

FIG. 1A-1D illustrate basic apparatus and steps in a known cold metal transfer process 20. In FIG. 1A, a consumable electrode 22 approaches an electrically conductive substrate 23, establishing an arc 24 that melts a melt pool 26 on a surface 28 of the substrate and creates a melt drop 30 of alloy filler material on the electrode tip. The melt pool solidifies into a deposit 32 on the substrate. In FIG. 1B the consumable electrode 22 is advanced 18 toward the melt pool. In FIG. 1C the melt drop 30 touches the melt pool, extinguishing the arc. Electrical current is prevented from spiking during the short circuit by a controller (not shown). In FIG. 1D the melt drop 30 adheres to the melt pool, and the electrode 22 is retracted 19. This pulls the drop 30 off of the electrode into the melt pool by surface tension, thus adding the drop as alloy filler material to the melt pool. This technology minimizes spatter and excess heating compared to other arc welding techniques, while providing fast deposition rates.

Figure 2:
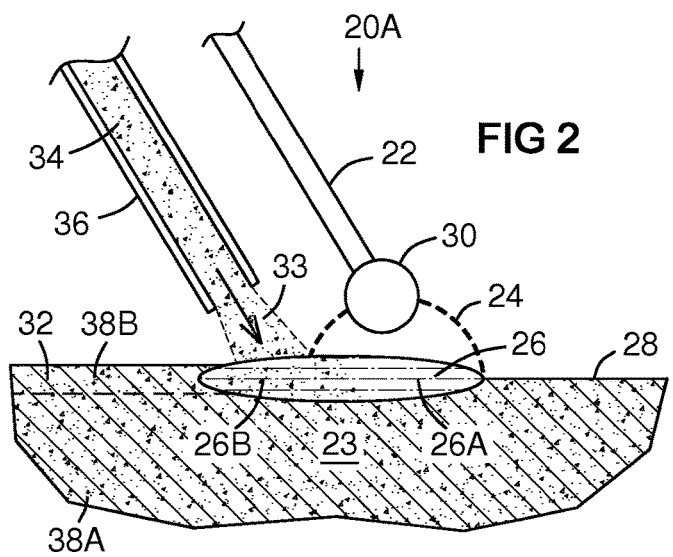
FIG. 2 schematically illustrates aspects of a method and apparatus for injecting a metal oxide into an alloy melt pool.

FIG. 2 schematically illustrates an embodiment 20A of a method and apparatus for injecting 33 a metal oxide into a melt pool 26 formed by cold metal transfer. The melt pool has a presently heated portion 26A and a presently unheated portion 26B. The unheated portion 26B may be a trailing portion of the melt pool after the electrode 22 has passed, i.e. resulting from movement of the electrode 22 to the right in the figure relative to the substrate 23. The metal oxide may be formed into a powder and transported by an inert carrier gas. At least most of the oxide 34 may be directed by a nozzle 36 onto or into the unheated portion 26B of the melt pool 26 so that at least most of the metal oxide is not directly intercepted by the arc 24. This prevents the oxide from melting or permits only superficial melting, and avoids or minimizes coalescing, thus allowing a substantially uniform distribution of small oxide dispersoids 38B in the deposit, which maximizes their effectiveness in resisting slippage at the alloy grain boundaries. The consumable electrode 22 may comprise filler metal to constitute the metal alloy matrix surrounding the deposit dispersoids.

The substrate 23 may be made of an oxide dispersion strengthened (ODS) alloy with dispersoids 38A, and the ODS deposit 32 may be formed of material matching the substrate for buildup or repair, or the deposit 32 may be formed of material different than substrate for substrate surface enhancement. ODS cladding, layering, or welding may be applied to a substrate that is or is not ODS. In another embodiment, the substrate may be replaced with a fugitive or removable support surface for additive manufacturing that builds a component by successive ODS layering starting with a first layer on the support surface.

Particles of the metal oxide 34 may contain at least one metal oxide having a higher melting point than the filler alloy of the electrode 22. Exemplary metal oxides include oxides of aluminum, calcium, cerium, chromium, cobalt, hafnium, lanthanum, magnesium, nickel, silicon, titanium, tantalum, thorium, yttrium and zirconium. Mixtures of oxide particles containing different metal oxides and/or having different particle sizes may be used, or the oxide particles may be changed over time as the deposition progresses in space. The oxide particles may be directed 33 into the melt pool 26 from above as shown with nozzle 36. Alternately, not shown, they may be injected directly into the melt pool 26 from below its surface via a refractory nozzle to avoid contact with the atmosphere.

Excessive heating of the oxide can lead to coalescence and slagging of dispersoids 30B, adversely affecting the oxide distribution in the ODS deposit. Optimal size, shape and distribution of the dispersoids 30B may be attained in part by adjusting the alloy melting energy by adjusting the intensity of the arc and the on-off dwell proportions of the arc. The power and dwell times of the arc may be controlled so that the melt pool meets or exceeds the melting point of the filler alloy of the electrode 22 and the substrate, but does not reach the melting point of the oxide particles. This prevents oxide coalescence and slagging.

Figure 3A:
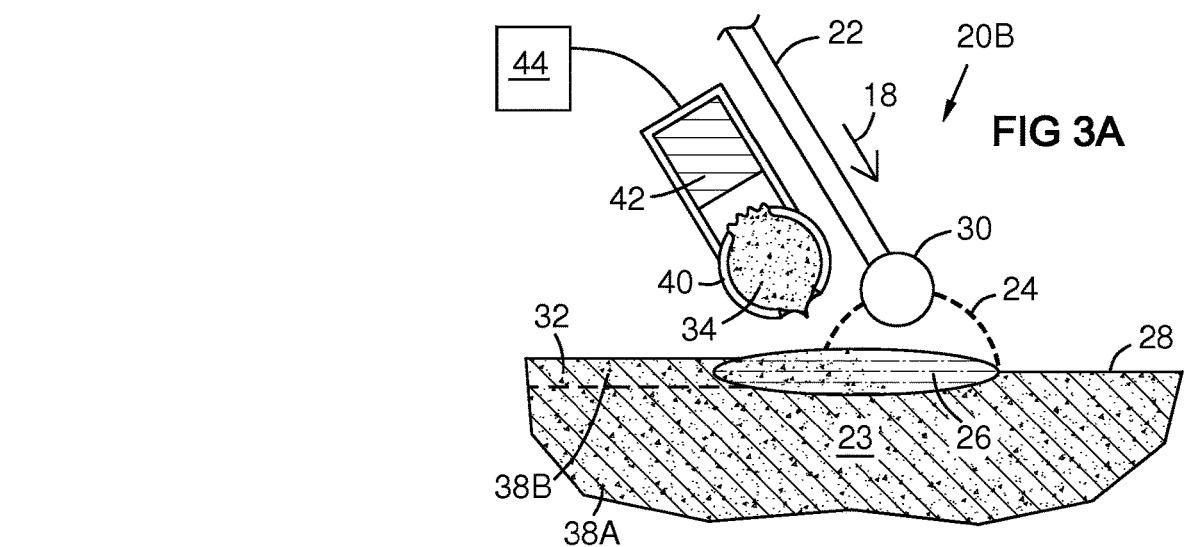
FIGS. 3A-B illustrate an embodiment of an additive cold metal transfer process in which oxide injection alternates with the melting energy to avoid intercepting the oxide particles with the arc.
Figure 3B:
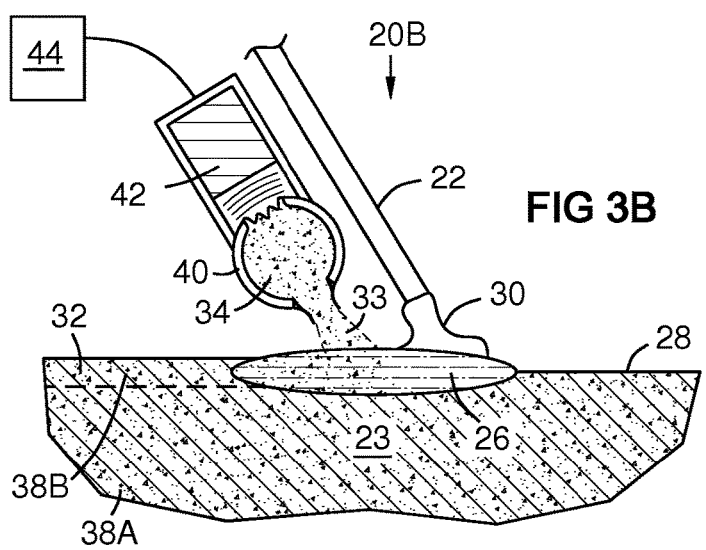

FIGS. 3A-B illustrate an additive cold metal transfer embodiment 20B in which oxide injection 33 alternates with the arc 24. In FIG. 3A the arc 24 is present and the oxide injection is stopped by a controller 44. The oxide may flow continuously in a recirculation channel 40 in a direction perpendicular to the page to maintain particle suspension in a carrier gas. In FIG. 3B the arc is extinguished when the melt drop 30 touches the melt pool 26, as in a cold metal transfer process. At this time the oxide is injected 33 by an oxide particle pulse driver 42, for example an acoustic driver, electrostatic particle deflector, or solenoid. This separation in timing of the injection 33 and the arc 24 prevents interception of the oxide by the arc, and avoids melting the oxide with the arc. Timing of the injection may be coordinated by alternately switching the pulse driver and the arc power. Such switching may optionally be triggered by a short circuit detector in the controller 44. The electrode 22 may be automatically advanced 18 toward and retracted from the melt pool multiple times per second—for example at least 10 times per second in some embodiments and up to 130 times per second in some embodiments. This action creates turbulence and forced convection in the melt pool that thoroughly mixes the oxide particles therein before solidification. At least some of the particles 33 may be injected to intersect the melt drop 30 so that they are carried into the melt pool 26 with the material of the melt drop 30.

FIGS. 4A-B illustrate another embodiment 20C in which oxide injection 33 alternates with an arc 24. In this example, a non-consumable electrode 45 creates an oxide dispersion strengthened autogenous weld or layer 47 on a non-ODS substrate 49. Alternately, an energy beam such as laser or electron beam, or a consumable electrode as in FIGS. 3A-B may be used. In addition to a non-consumable electrode or energy source, a supplemental filler metal may be fed. The process of FIGS. 4A-B includes no filler material, but it serves to form a layer 47 containing dispersoids 38B. In FIG. 4B the arc 24 is switched off and the oxide material 34 is injected 33 by an oxide particle pulse driver 42. Here the oxide injection overlaps the arc in space, but they are mutually exclusive in time so the oxide is not directly intercepted by the arc. Overlapping in space allows injecting the particles into the most active part of the melt pool to facilitate mixing before solidification.

FIG. 5 shows an overlap between the melting energy 24 and the oxide injection 33 at the surface of the melt pool 26. For example the area of the melting energy at the surface of the melt pool may be at least 40% or 60% overlapped by the area of the oxide injection at the surface of the melt pool or the area of the oxide injection at the surface of the melt pool may be at least 40% or 60% overlapped by the area of the melting energy at the surface of the melt pool.

The distribution of the dispersoids 38B in the ODS alloy deposit 32 may be controlled by altering the velocity and concentration of particles of the oxide material 34 injected into the melt pool 26. Increasing the velocity or concentration of the oxide particles fired into the melt pool increases the proportion of dispersoids in the resulting deposit 32. Increasing velocity can also provide a more uniform distribution when the melt pool is especially viscous.

FIG. 6 shows an oxide pulse driver 46 having a rotating oxide carrier cylinder 48 or wheel with a gap 50 that aligns with a gap 52 in a housing 54 to produce a pulse 56 of oxide 34. The rotation rate of the carrier cylinder may be synchronized with the cyclic translation of the electrode tip in a cold metal transfer process or with the alloy melting energy in any process such that the oxide pulse does not overlap the melting energy in time. The carrier cylinder 48 may be part of a recirculation circuit as previously described.

Herein, cold metal transfer and pulsed arc welding are illustrated as exemplary. Alternate technologies that can provide the alloy melting energy include pulsed gas metal arc welding, pulsed gas tungsten arc welding, pulsed tip tungsten inert gas welding (pulsed tip TIG), and pulsed energy beams, including for example a laser beam, a particle beam, a charged-particle beam, a molecular beam, etc. The cold metal transfer process is advantageous because of its mechanical mixing of the melt pool by rapid repetitive dipping of the electrode tip, high deposit control and relatively low heat. In addition to welding and cladding, it can form an extensive variety of additive deposition forms and wall growth directions. Tip tungsten inert gas welding may also be advantageous because of superimposed mechanical oscillation of feed wire helping to agitate the molten weld pool and promote oxide distribution therein. The on/off switching of the alloy melting energy described herein includes in some embodiments switching between a first energy level (on) and a second energy level (off) that is less than 50% of the first energy level.

Embodiments of the present disclosure enable the formation and repair of ODS superalloy components. However the invention is not confined to such materials and may also be applied to other ODS materials.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A process for forming an oxide strengthened alloy, comprising:
    applying a melting energy to a metal alloy material, creating a melt pool thereof, the melting energy cycling between a first energy and a second energy, wherein the second energy is less than 50% of the first energy; and
    injecting a metal oxide into the melt pool, wherein the metal oxide comprises particles with a higher melting point than the metal alloy material, and wherein the injecting occurs only when the melting energy is at the second energy; and
    wherein solidification of the melt pool forms a deposit of the metal alloy material with the metal oxide dispersed therein.

2. The process of claim 1, further comprising separating the injecting of the metal oxide into the melt pool from the applying of the first energy by a space sufficient to prevent complete melting of at least most of the metal oxide.

3. The process of claim 1, wherein the applying of the first energy and the injecting of the metal oxide overlap each other in space at mutually exclusive times such that the metal oxide is not directly intercepted by the first energy.

4. The process of claim 1, wherein an area of the first energy at a surface of the melt pool is at least 40% overlapped by an area of the oxide injection at the surface of the melt pool, or the area of the oxide injection at the surface of the melt pool is at least 40% overlapped by the area of the first energy at the surface of the melt pool.

5. The process of claim 1, further comprising cycling the injecting of the metal oxide such that injecting occurs each time the melting energy is the second energy, and wherein the second energy is between a state where the melting energy is switched off and a state where the melting energy is 50% of the first energy.

6. The process of claim 1, further comprising:
    advancing and retracting an electrode to and from the melt pool to alternately create and close a gap there between multiple times per second;
    alternately powering the electrode at the first energy to create an arc in the gap and switching off the power or reducing the power to the electrode to the second energy when the gap is closed; and
    activating a particle injection pulse driver that delivers pulses of particles of the metal oxide into the melt pool only when the arc is at the second energy.

7. The process of claim 6, wherein the electrode is consumable, is formed of a metal alloy filler material for the melt pool, and the arc is off at least when a molten drop of the filler material on the tip of the electrode contacts both the melt pool and the electrode.

8. The process of claim 7, further comprising directing the pulses of particles of the metal oxide to at least partially impact the molten drop of the filler material as the molten drop contacts the melt pool.

9. The process of claim 6, further comprising switching electrode power off or to the second energy level and activating the pulse driver in response to a short circuit between the electrode and the melt pool.

10. The process of claim 6, wherein the pulse driver projects particles of the metal oxide from a flow of said particles in a carrier gas in a recirculation channel.

11. The process of claim 6, wherein the pulse driver comprises an acoustic driver or an electrostatic particle deflector.

12. The process of claim 6, wherein the pulse driver comprises a rotating oxide particle containment cylinder or wheel comprising a gap that intermittently aligns with a gap in a housing, thus metering and expelling the oxide particles, wherein a rotation rate of the cylinder or wheel is synchronized with the powering of the electrode such that the oxide injection pulses do not overlap the first energy level in time.

* * * * *